United States Patent [19]

Vick

[11] 3,978,891

[45] Sept. 7, 1976

[54] QUIETING MEANS FOR A FLUID FLOW CONTROL DEVICE

[75] Inventor: Ralph L. Vick, Granada Hills, Calif.

[73] Assignee: The Bendix Corporation, North Hollywood, Calif.

[22] Filed: May 15, 1974

[21] Appl. No.: 470,251

Related U.S. Application Data

[63] Continuation of Ser. No. 293,956, Oct. 2, 1972, abandoned.

[52] U.S. Cl. .............................. 138/42; 137/625.3; 137/501; 251/127
[51] Int. Cl.² ...................... F16K 47/08; F15D 1/02
[58] Field of Search ............ 137/625.3; 138/40, 42, 138/43; 251/127

[56] References Cited
UNITED STATES PATENTS

| | | | |
|---|---|---|---|
| 1,790,854 | 2/1931 | Defrance et al. .................. | 138/40 X |
| 3,529,628 | 9/1970 | Cummins ........................... | 138/43 X |
| 3,692,064 | 9/1972 | Hohnerlein et al. ................ | 138/42 |
| 3,802,537 | 4/1974 | White ................................. | 137/625.3 X |
| 3,856,049 | 12/1974 | Scull .................................. | 138/42 |

FOREIGN PATENTS OR APPLICATIONS

| | | | |
|---|---|---|---|
| 780,188 | 7/1957 | United Kingdom .................. | 138/42 |

Primary Examiner—Alan Cohan
Assistant Examiner—Gerald A. Michalsky
Attorney, Agent, or Firm—Robert C. Smith; William F. Thornton

[57] ABSTRACT

Quieting means for a fluid flow control device is shown in connection with a typical spool type throttling valve. The quieting means consists of a stack of washer-like members or disks which cooperate to define a large number of finely-divided flow paths across the stack of disks. To provide a configuration which is very economical of space, the disks are arranged such that the flow path turns back and forth through different planes. Groups of flow paths are defined by a number of groups of three perforated disks confined between two imperforate disks. Two perforated disks having patterns of slots are positoned on opposite sides of a similar disk having a pattern of small orifices. By proper juxtaposition of the three disks, a circuitous flow pattern is established from a first chamber defined by a first slot and its side walls, axially through one or more orifices to a second such chamber, substantially radially through said second chamber and axially in the opposite direction to another such chamber and continuing in this manner across the stack of disks. The dimensions of the slots and orifices are chosen such that the velocity of flow through any orifice does not exceed a desired limit.

7 Claims, 14 Drawing Figures

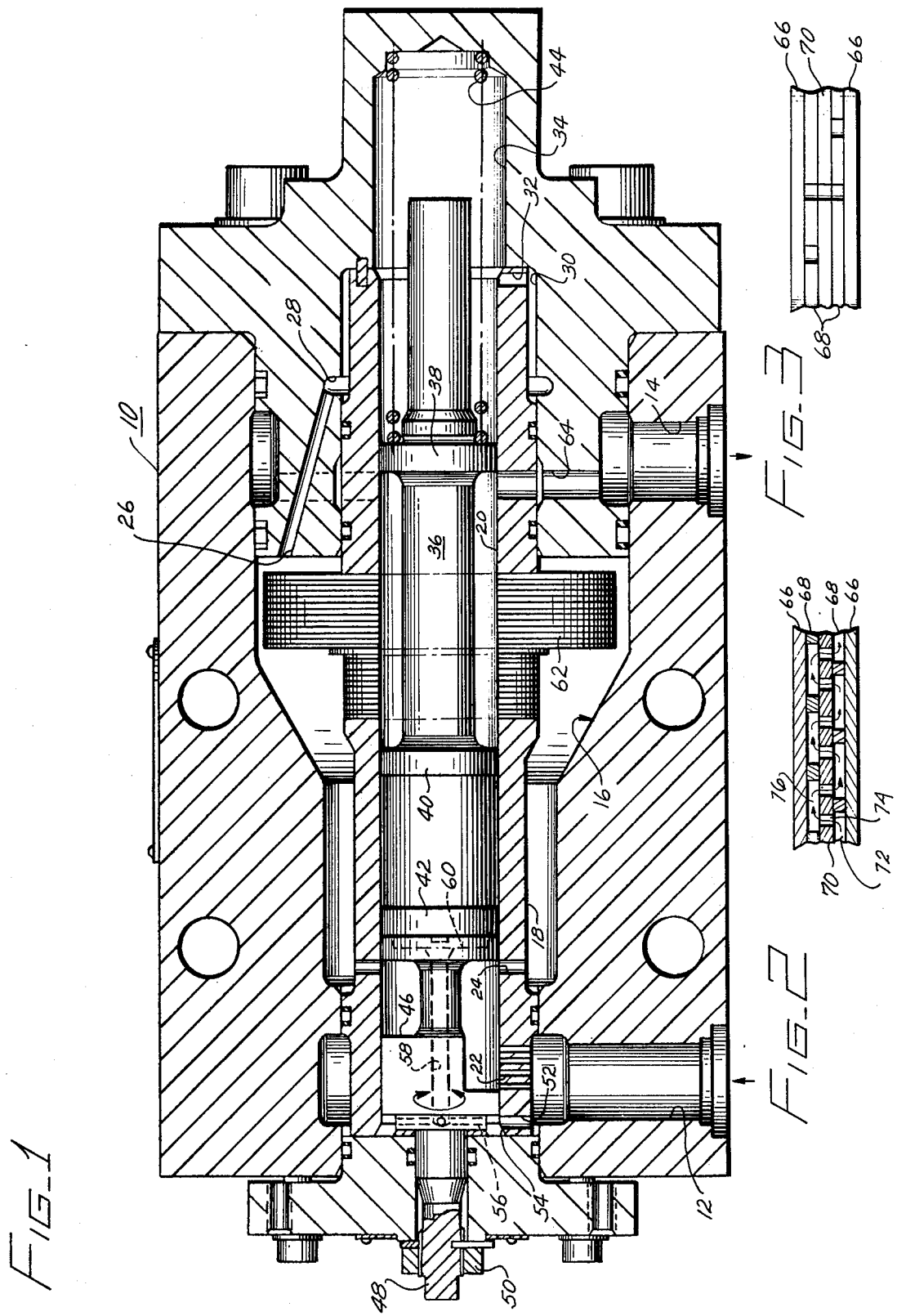

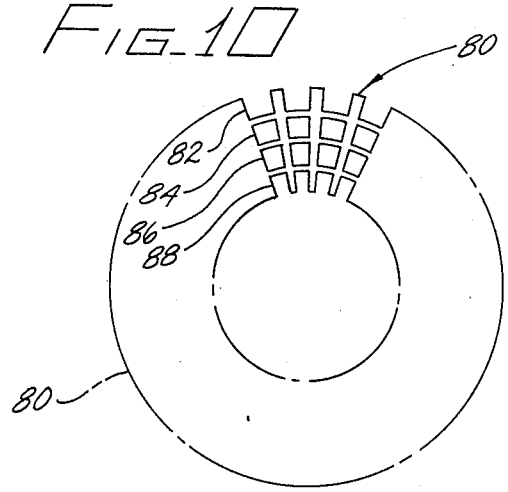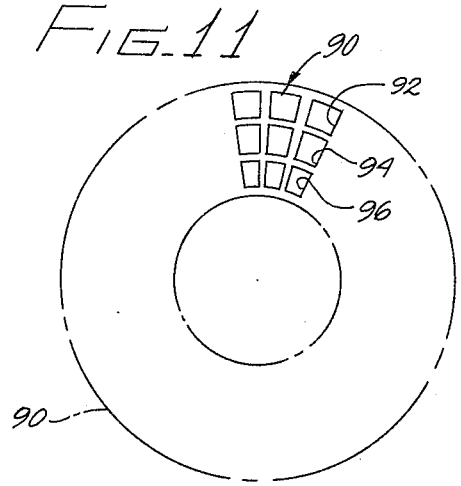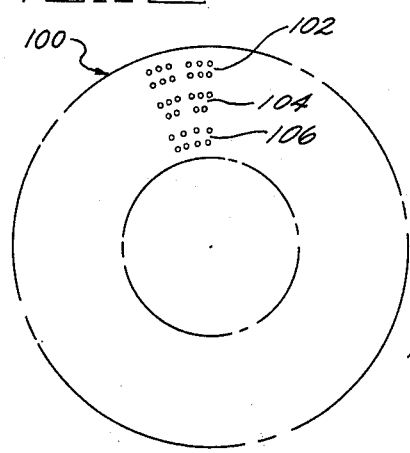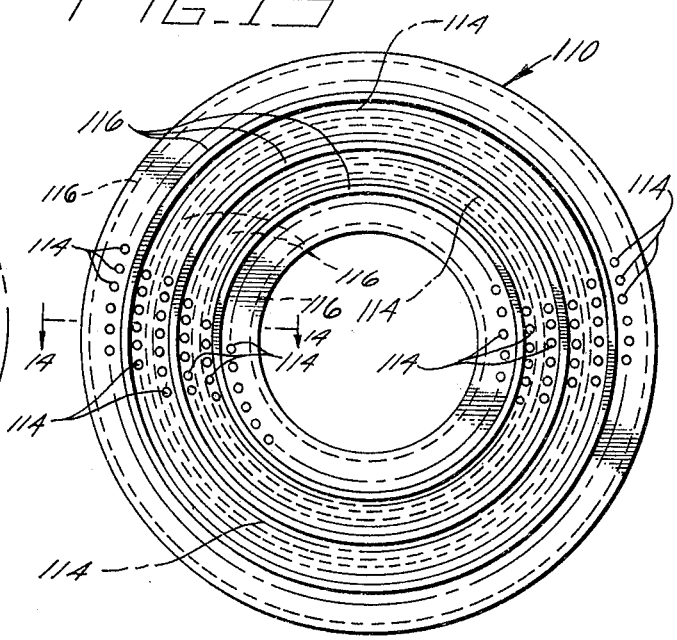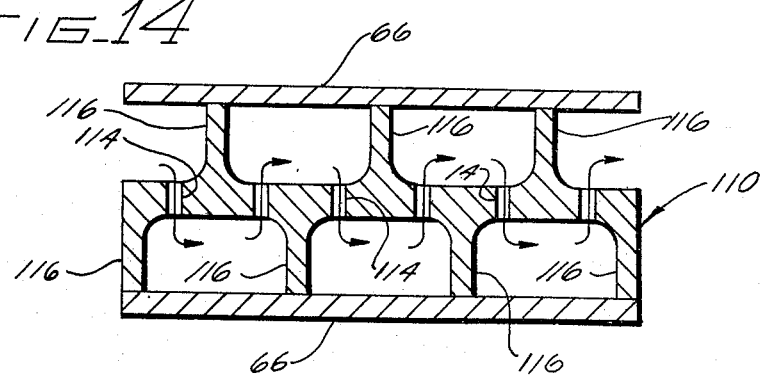

QUIETING MEANS FOR A FLUID FLOW CONTROL DEVICE

This is a continuation of application Ser. No. 293,956, filed Oct. 2, 1972, now abandoned.

BACKGROUND OF THE INVENTION

In a wide variety of practical applications there is a need for structures to vary the fluid-flow rate of flowing fluids without the production of noise and vibration. The term "throttling" is generally applied to the function of altering or adjusting fluid flow throughout a range of flow rates. The various structures by which the function is performed are generally called "throttling valves" to distinguish them from structures whose function is to open and close a flow path as a step function. To the extent that on-off valves are not opened and closed instantaneously, so that throttling noise and vibration may be produced therein at the time of opening or closure, the invention described herein is applicable to such valves as well, and they are included in the term "throttling valve".

A typical control valve for handling the flowing of high pressure fluids employs a structure in which the cross-sectional area of the flow path is altered. This type of structure generally produces substantial noise and vibration and is quite subject to damage from cavitation. However, the structures employed in this arrangement are, as a class, least expensive and most conveniently employed. Of particular interest herein is a structure for quieting of spool valves. In general, the noise, vibration and cavitation generated in orificial valves is an incident to the Venturi effect which attends movement of the fluid through the orificial opening. When the orifice has reduced cross-sectional area, or is throttled, fluid velocity is reduced, and its pressure energy is reduced. The energy difference results in turbulence following the orifice where it is transformed into increased internal temperature of fluid and into acoustic energy in the form of noise transmitted through the fluid and in vibration in the surrounding structure, some of which occurs at audible frequency. In extreme cases, the turbulence results in localized pressure reductions downstream from the orificial restriction sufficient to form vapor spaces or pockets. The vapor in these spaces is returned to liquid as the vapor bubble is imploded by the pressure of the medium surrounding the bubble. This phenomenon is called cavitation and results in noise and occasional erosion of adjacent surfaces of the valve structure. It will be appreciated that there are many applications for which it is desired to substantially reduce both the noise and the effects of cavitation in operation of spool valves. A similar useful effect is produced when the resulting noise is of a magnitude and frequency such that it is not readily transmitted to or through the surrounding structure.

There have been many structures devised in an attempt to deal with the noise, vibration and possible cavitation resulting from operation of valves in high pressure systems. Most of these have involved some form of baffling means which operate in one way or another to divide the flow into finely divided streams. One such arrangement involves creating a baffle consisting of a number of successive layers of fine screen-like material which are held tightly together and preferably brazed since it is necessary to avoid mechanical vibration of the parts. Another type of structure which has been proposed and used to some extent includes baffles or sleeves of sintered metal. Both of these latter arrangements have proven unsuccessful for severe applications in that the amount of quieting provided is insufficient and that, in the case of the sintered elements, there is some inconsistency in structure which makes the results somewhat unpredictable. Another type of structure which has been used consists of a stack of disks having tortuous passageways etched on adjacent surfaces to thereby provide a large number of discrete flow paths with many turns as a means of frictionally inhibiting the flow across the stack. This arrangement can provide good quieting, but since it relies essentially on frictional losses, performance is quite susceptible to viscosity changes which are an inherent result of temperature changes.

DESCRIPTION OF THE DRAWINGS

FIG. 1 is a cross-sectional view of a typical spool-type valve using my invention;

FIG. 2 is a partial sectional view through a stack of quieting elements as used in FIG. 1 showing the flow path therethrough;

FIG. 3 is an edge view, partly broken away, of a stack of quieting elements such as those of FIG. 2, showing the detent means used to assure radial alignment of the elements;

FIG. 10 is a plan view of one of a first group of quieting elements of an additional embodiment having a somewhat different orifice arrangement;

FIG. 11 is a plan view of one of a second group of elements which cooperate with the elements of FIG. 10; and FIG. 12 is a plan view of another of the second group of elements.

FIGS. 13 and 14 are views of an additional embodiment of the invention.

DESCRIPTION OF THE PREFERRED EMBODIMENT

Figure 4:
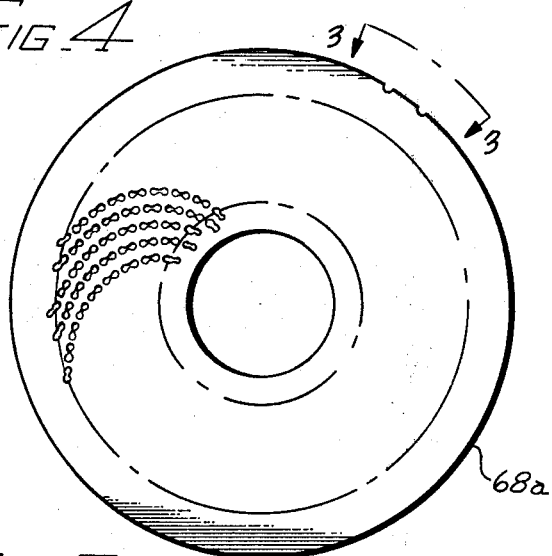
FIG. 4 is a plan view of one of a first group of quieting elements showing the pattern of elongated passages therethrough prior to final assembly and trimming.

A flow control valve is shown generally at numeral 10 whose purpose is to provide a desired quantity of flow irrespective of pressure changes across it. Fluid from a source, not shown, is supplied to an inlet passage 12, and flow from the valve member 10 is provided to an external utilization device, also not shown, through an outlet conduit 14. Fixed within a large internal chamber 16 of valve 10 is a stationary, generally cylindrical member 18 having an axial bore 20 therethrough. Drilled through the side wall of member 18 in communication with inlet passage 12 are a number of small radially and axially arranged orifices 22 which communicate with bore 20 and through a passageway 24 with chamber 16. Fluid in chamber 16 is communicated through a passageway 26 to an annulus 28, chamber 30 and a passageway 32 to a chamber 34 defined partially of the bore 20. Reciprocable within bore 20 is a spool valve 36 which includes a spool member 38, another spool member 40, and a spool member 42. Abutting against spool member 38 is a spring 44 which urges spool 36 toward the left.

Abutting against the spool member 42 is a control valve member 46 which is also positioned within bore 20 which is manually movable in a radial manner with rotation of the externally exposed shaft 48 which is held in a desired position by means of a lock nut 50. Fluid pressure in inlet 12 is communicated through a passageway 52 into an annulus 54 from whence it communicates with a plurality of radial passageways 56 connected to an axial passageway 58 and from thence to a chamber 60. Fluid pressure in chamber 60 is exerted against the end of spool 42 in opposition to the force of spring 44.

Rotation of the manually adjustable shaft 48 which, in turn, rotates member 46 causes member 46, which is cut away over a portion of its circumference, to successively cover or uncover a desired number of the orifices 22. When member 46 has been rotated to the desired position to cover the requisite number of orifices 22, lock nut 50 is tightened, thereby maintaining member 46 in the desired radial position.

Fluid flowing through the valve 10 passes into inlet conduit 12, across orifices 22, through passage 24 into chamber 16. From chamber 16 it flows across a large number of finely divided passageways represented by the washer-like elements shown at numeral 62 and from thence to the chamber formed within bore 20 between spool elements 38 and 40. This chamber communicates with outlet passage 14 through a conduit 64.

The orifices 22 interpose a controlled pressure drop and essentially the only substantial pressure drop between the passage 12 and chamber 34. Since passageways 52, 56 and 58 simply communicate with chamber 60 and no flow rate occurs through these passages except during transient movement of spool 36, fluid at what is essentially inlet pressure is provided to the chamber 60, and this fluid pressure acts to urge spool member 36 toward the right against the spring 44. Since the fluid pressures on the opposite ends of spool member 38 act on essentially equal areas, it will be appreciated that spool 36 will tend to seek a position where the fluid pressure differential thereacross will be balanced by the force of spring 44.

As shown, the valve member 36 is in its maximum leftward position. In the case of a substantial pressure drop downstream of outlet port 14, this lowered pressure will be communicated into the chamber 34, and inlet pressure in chamber 60 will cause the spool member 36 to move toward the right. As it moves toward the right, it will cause spool 40 to successively cover more and more of the finely divided orifices discharging fluid from the disks 62 into the chamber between spools 40 and 38. Since the valve 10 is designed to operate with very high pressure differentials (approximately 4000 psi), any significant throttling action across it will result in the creation of noise and vibration, absent the use of quieting means such as disks 62. It has been found that the use of such quieting means will reduce the structural borne noise associated with valves of this type from over 130 db at frequencies up to 10 KH$_z$ to less than 80 db within this frequency range.

It will be appreciated that the valve described above is only one of many types which might be shown as exemplary of an application for applicant's quieting means. This quieting structure would also be applicable for use in connection with servo valves of the type shown in the patent to D. V. Healy U.S. Pat. No. 3,095,002 and particularly in connection with the second stage of this or any similar type of electrohydraulically driven servo valve.

FIG. 2 is an enlarged sectional drawing showing partial flow paths through the disks 62. This bank of disks 62 consists of successive groups of elements arranged as shown in FIG. 2 to provide a circuitous path across the elements. Positioned between each pair of solid disks 66 are a pair of disks 68 having elongated openings and positioned therebetween a single disk 70 having orifices of relatively small diameter. The fluid flow is confined between the solid disks 66 and proceeds from a chamber 72 formed by an opening in disk 68 cooperating with a solid disk 66 and the disk 70. The flow then proceeds fom this chamber across a small orifice 74 of disk 70 into a similar larger chamber 76 in the opposite disk 68. In this manner fluid flows from a chamber through an orifice to a similar chamber and then reverses direction across the next small orifice into another larger chamber and follows this pattern from outside to inside of the stack of disks. In the arrangement shown in FIG. 2, there is very little restriction of frictional resistance in the elongated chambers 72, 76, etc., and essentially all of the pressure drop occurs across the orifices in disk 70.

FIG. 3 is a view of an outside edge of some of the disks shown in FIG. 2, showing the manner in which the disks 68 and 70, in particular, are notched to provide indexing means to assure that the orientation of these members relative to each other is such that flow will be as described. Other suitable indexing arrangements could be used, but this has been found satisfactory for production.

Figure 5:
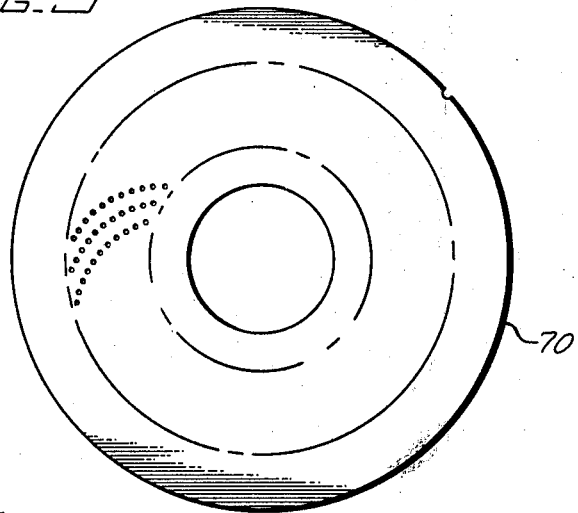
FIG. 5 is a plan view of one of a second group of quieting elements showing the pattern of orifices therethrough prior to final assembly and trimming.
Figure 6:
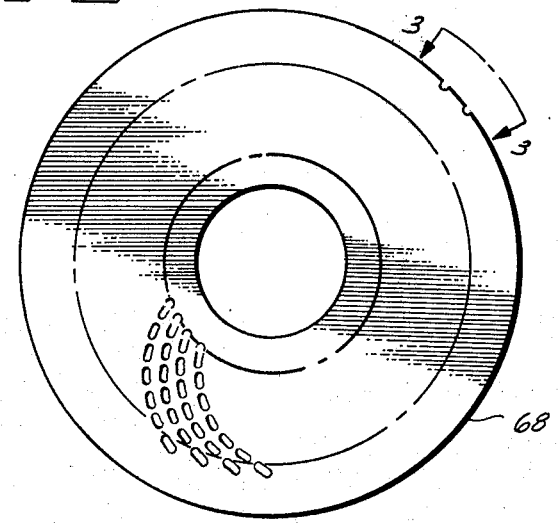
FIG. 6 is a plan view of one of a group of quieting elements similar to those of FIG. 4, but using passageways of a different shape from those of FIG. 4.

FIGS. 4 through 9 are plan views of the several disks 66, 68, 68a and 70 at different stages of production. It will be appreciated that disks 66 are plain disks like that shown in FIG. 9 with a large central opening and are formed to the desired dimensions. FIG. 4 shows a plan view of a disk similar to that shown at numeral 68 in FIGS. 2 and 3, but since the perforations are somewhat different this disk has been given numeral 68a. A series of dumbbell-shaped perforations are cut through the disk 68a and extend from near the outside edge to near the inside edge. FIG. 5 is a similar plan view of disk 70 which includes a plurality of small orifices arranged to be positioned between the chambers formed in the disks 68 or 68a, as described. FIG. 6 is a plan view of a disk 68 similar to that of FIG. 4 except that the elongated perforations have straight sides. It will be appreciated that the rows of perforations extend for the entire circumference of the disk rather than for a small arc, as shown. FIGS. 4, 5 and 6 show the indexing notches at their edges as described in connection with FIG. 3. When disks 68 or 68a are assembled in a stack, indexing the individual disks one notch apart results in the continuous and circuitous flow pattern shown in FIG. 3.

Figure 7:
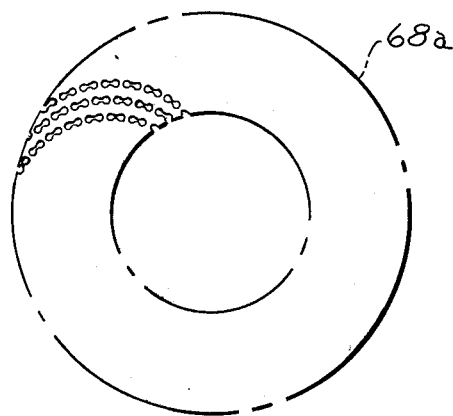
FIG. 7 is a plan view of the element of FIG. 4 after trimming.
Figure 8:
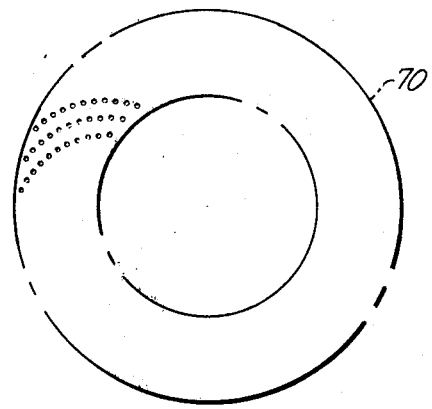
FIG. 8 is a plan view of the element of FIG. 5 after trimming.
Figure 9:
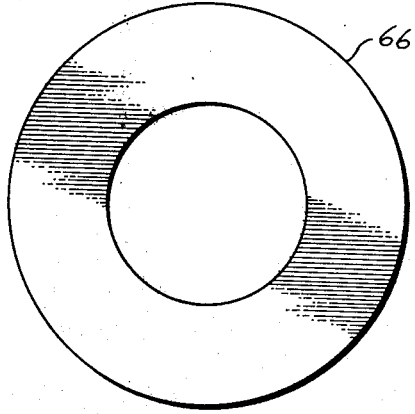
FIG. 9 is a plan view of an unperforated element after trimming.

When the stacks have been assembled to the length desired, the disks may be fastened together in any desirable manner, as by brazing, etc., and they are then trimmed to dimensions as shown in FIGS. 7, 8 and 9 with the outside circumference being cut down and the inside bore enlarged until both ends of the elongated ports of elements 68 and 68a are exposed. Once this is done, it is possible for the flow to proceed across the stack as shown in FIG. 2.

FIGS. 10, 11 and 12 show a modified form of disk pattern wherein the flow may proceed through a number of orifices in parallel. The disk 80 has a number of openings 82, 84, 86 and 88 which are of such area that they serve to define the size of chambers which overlie a group of several orifices. Disk 90 includes openings 92, 94 and 96 which are radially displaced relative to the openings in disk 80. Disk 100 includes a number of groups of orifices which are spaced such that when disks 80, 90 and 100 are stacked, a flow pattern essentially identical to that shown in FIG. 2 results, except that additional orifices are in parallel with the one shown for conveying fluid from one chamber to the next. Thus, flow entering opening 82 will flow through the outside row of orifice group 102 into a chamber defined by opening 92, through the inside row of orifice group 102 to a chamber defined by opening 84, thence through the outside row of orifice group 104, etc.

A still additional embodiment is represented by the disk 110 shown in FIG. 13. A number of upstanding coaxially arranged ridges 116 extending from the opposite sides of disk 110 cooperate with blank disks 66 to define annular chambers which communicate with each other through orifices 114. FIG. 14 is a sectional view of the embodiment using disk 110 with disks 66 showing a flow pattern similar to that of FIG. 2 except that the chambers are annular.

In all the modifications shown, the theory of operation is essentially the same. It has been observed that the noise caused by flow across an orifice is a function of Reynold's number, and one of the factors of Reynold's number which has caused problems with similar devices is fluid viscosity which may change a substantial amount, rendering noise performance variable. With the design described above where flow is from a chamber of comparatively large volume across a small orifice to another such large chamber, the velocities across the orifices are controlled by selection of the orifice diameter and the over-all pressure drop across the stack, and there is a comparatively small amount of loss due to frictional resistance. In this application, operation is such that Reynold's number is kept in a range where there is little change in the orifice coefficient. As a result, there is also relatively little change in flow characteristics as a function of variations in viscosity. This configuration then permits one to design a quieting structure for valves having very large pressure differentials thereacross and in which variations in viscosity have comparatively little effect on the over-all flow characteristics. This is very useful since such changes are continually a factor to be dealt with because of temperature changes throughout the system.

It will be apparent to those skilled in the art that the computation of the number and size of orifices in series to effect the desired noise reduction is straightforward based on the understanding that the velocity across (or flow through) the individual orifices should not exceed values which will result in an excessive Reynold's number. Use of the dumbbell-shaped configuration of FIG. 4 does permit an additional orifice to be included in the plates 68a, as well as that of plate 70, so that the number of orifices in series is increased.

It will also be readily apparent that since the Reynold's number is a function of orifice diameter and fluid viscosity, certain adjustments of orifice diameter can be made to compensate for fluid viscosity changes throughout this series orifice flow path. This allows optimum use of space in a throttling valve, since each orifice can be tailored to provide a maximum pressure drop within the desired noise level.

In addition to the Reynold's number effect on noise resulting from a single orifice, orifices in series and paths in series or parallel, it has been determined that high frequency throttling noise, as when any defined flow path such that across the spool valve of FIG. 1 is only partially opened (short metering length), can be controlled by regulating the throttling fluid velocity relative to the length of path opening. In this instance metering length is defined as the opening resulting from axial movement of the valve spool and metering width by the circumference of the spool and sleeve. Therefore, given a fixed impedance flow path, throttling velocities into that path can be controlled by controlling the width of the entrance to that path. By providing quiet throttling in addition to quiet flow in the wide open path, high frequency noise (above approximately 3 $KH_z$) can be controlled. Noise in the lower frequencies can be controlled by limiting the nonmetering valve path velocities to very low values (approximately 15 to 20 feet per second or less), as is well known to those skilled in the art.

I claim:

1. A fluid flow controlling device comprising:
   a rigid structure comprising a series of stacked laminar members having abutting faces, alternate ones of said members having respective patterns of passageways therethrough, said passageways being in offset but partially overlapping relation to one another and others of said members including means defining a plurality of orifices of substantially smaller effective area than the area of said passageways but aligned with the overlapping parts of pairs of said passageways such that a plurality of generally radial flow patterns are created across said structure with individual passages being defined by a plurality of adjacent said stacked laminar members providing two overlapping passageways and an orifice therebetween, said orifice members being positioned between others of said laminar members and some of said laminar members providing walls confining individual flow patterns such that each such pattern always changes direction to flow across the same orifice member, wherein the pressure drop across said structure is substantially that caused by the orificial losses across said orifices in series.

2. A fluid flow device as set forth in claim 1 wherein any flow passageways which are not required for throttling control are made large to minimize fluid velocities.

3. A flow control device as set forth in claim 1 wherein a plurality of orifices in parallel direct fluid into individual said passageways.

4. In a flow control device for installation in a fluid transfer system including a flow of fluid under high pressure such that a potentially destructive or noise-generating fluid pressure differential exists;
   a rigid structure comprising a series of stacked laminar members having abutting faces, nonadjacent ones of which have a pattern of elongated passages therethrough defining areas of individual chambers and others of said members being interposed between pairs of said nonadjacent members and having a pattern of orifices providing communication between said passageways, said passageways and orifices alternating in patterns across said members to produce a plurality of individual streams of fluid flowing across said structure, said orifices being of stubstantially smaller cross-sectional area than said passageways such that the pressure drop across said structure is substantially that caused by the orificial losses across the orifices in series, and some of said laminar members providing walls confining groups of said individual streams such that each such stream always changes direction to flow across the same orifice member.

5. A flow control device as set forth in claim 4 wherein the fluid velocity on the downstream side of said structure is substantially the same as that on the upstream side.

6. A flow control device as set forth in claim 4 wherein the number of series orifices and their effective areas are chosen such that the Reynold's number for any one of said orifices does not exceed a value equivalent to the desired noise level.

7. A fluid flow controlling device comprising:
means providing a plurality of passageways through which flow of fluid is subdivided, said means comprising
a series of stacked members having abutting faces and arranged in groups, two of said members of each group being disks and a third member being interposed between said disks and comprising a disk having a plurality of concentric annular ridges on one side and a plurality of similar ridges on the opposite side spaced radially from those on said one side and a plurality of orifices extending through the web of said member between said ridges,
said orifices thereby directing flow into different planes and providing orificial pressure reductions, each of which is followed by chambers of larger cross-sectional area.

* * * * *